Oct. 2, 1951  E. C. AVINGER ET AL  2,569,878
MACHINE FOR CUTTING LOGS INTO SECTIONS
Filed June 4, 1948  4 Sheets-Sheet 1

INVENTOR.
E. C. AVINGER +
BY T. T. MURPHY

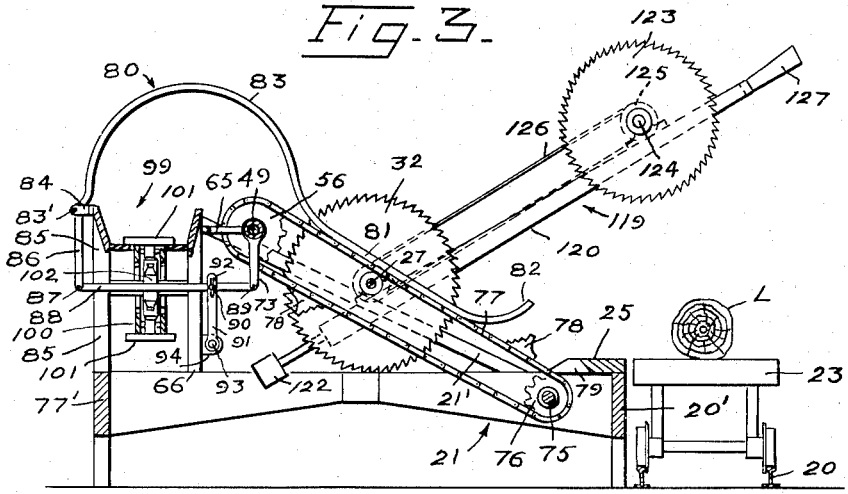
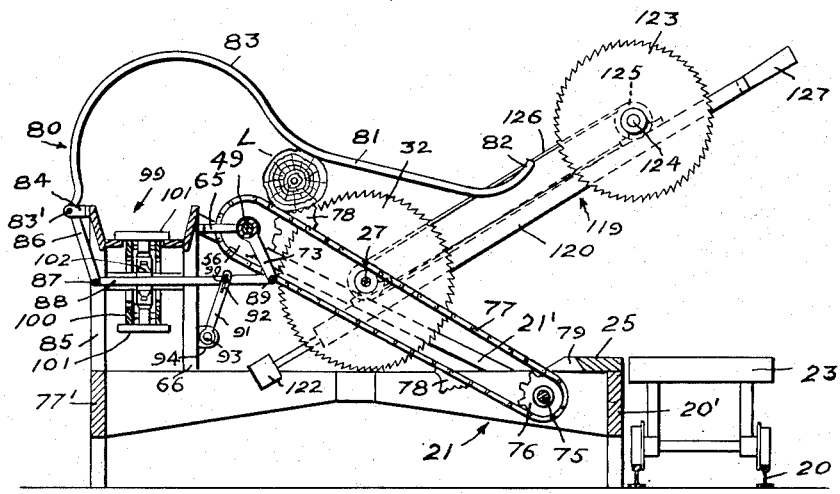

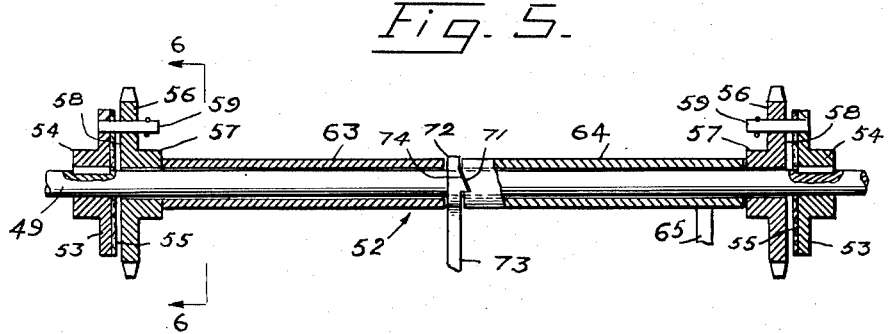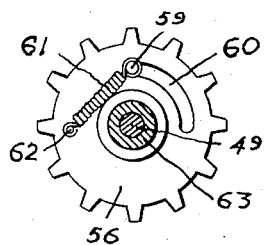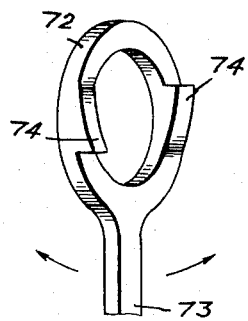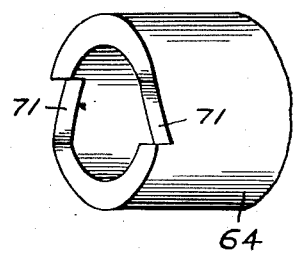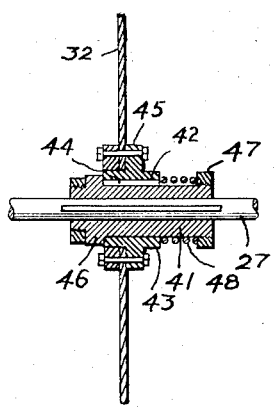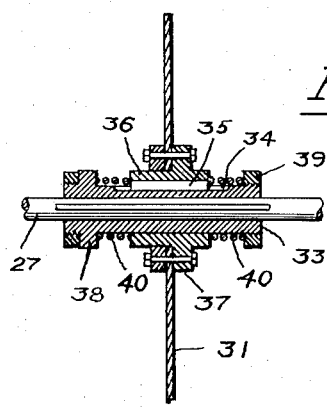
INVENTOR.
E. C. AVINGER +
BY T. T. MURPHY Oct. 2, 1951   E. C. AVINGER ET AL   2,569,878
MACHINE FOR CUTTING LOGS INTO SECTIONS
Filed June 4, 1948   4 Sheets-Sheet 4
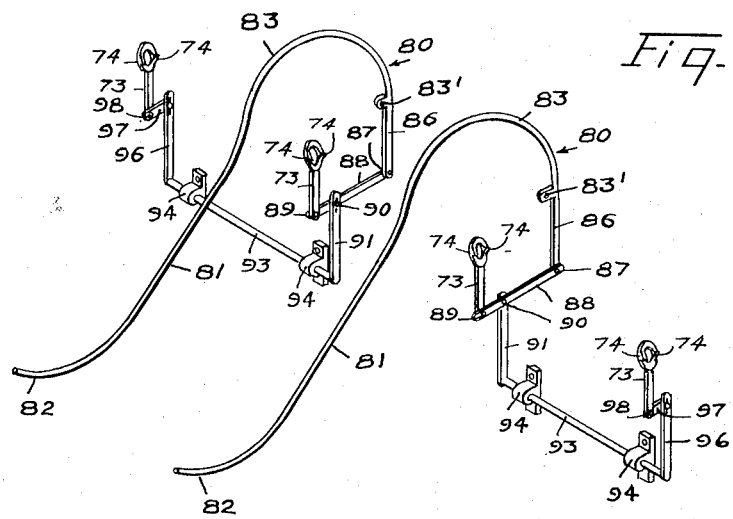
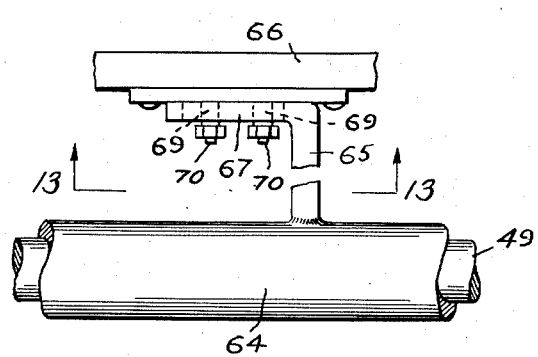
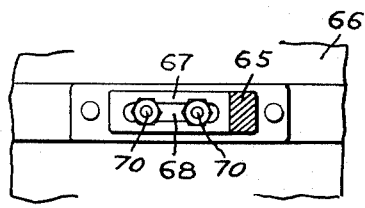
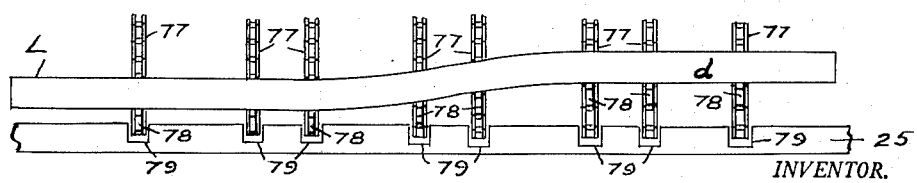
INVENTOR.
E. C. AVINGER +
BY T. T. MURPHY Patented Oct. 2, 1951

2,569,878

UNITED STATES PATENT OFFICE 2,569,878

MACHINE FOR CUTTING LOGS INTO SECTIONS

Ernest C. Avinger and Theodore T. Murphy, Wando, S. C.

Application June 4, 1948, Serial No. 31,168

7 Claims. (Cl. 143—49)

Our invention relates to improvements in gang saw machines of the type used to cut logs for making pulpwood or the like.

A primary object of the invention is to provide a gang saw machine including a plurality of endless conveyor elements for moving logs through the saws, wherein novel clutch means are provided to permit the individual endless conveyor elements to adjust themselves, to compensate for crookedness in the log being cut.

A further object of the invention is to provide a linkage mechanism for controlling the setting and releasing of the clutch means, such linkage mechanism being actuated by the log being conveyed through the saws.

A further object is to provide a gang saw machine of the class mentioned, wherein means are provided to permit the lateral shifting of the individual saws, so that the cut log sections cannot damage the saws if such sections become turned or cocked while between the saws.

A further object is to provide a machine of the above mentioned type which is adapted to advance a long uncut log into position for being passed through the gang saws, cutting the long log to the proper length before it is placed upon the endless conveyor elements, passing the log thus cut through the gang saws where it is cut into sections for making pulpwood and the like, and depositing the cut log sections onto a suitable conveyor from which they are discharged into a vehicle, or the like.

A still further object is to provide a gang saw machine wherein the main elements of the machine are driven from a single source of power, the machine being quite simplified in design and relatively inexpensive to build.

Other objects and advantages of the invention will be apparent during the course of the following description.

In the accompanying drawings, forming a part of this application, and in which like numerals are employed to designate like parts throughout the same, Figure 1 is a plan view of the gang saw machine embodying our invention, Figure 2 is a side elevation of the same as viewed on line 2—2 of Figure 1, Figure 3 is a transverse vertical section taken on line 3—3 of Figure 1, Figure 4 is a similar section showing a log conveyed through the gang saws and the clutch actuating levers raised by the log to clutch setting positions, Figure 5 is an enlarged fragmentary longitudinal vertical section through one set of clutches and associated elements, Figure 6 is a transverse vertical section taken on line 6—6 of Figure 5, Figure 7 is an enlarged fragmentary perspective view of a clutch setting crank, Figure 8 is a similar view of a co-acting clutch setting sleeve, Figure 9 is a central section through the hub of one of the outer saws of the gang saw machine, Figure 10 is a similar section through the hub of the central saw of the machine, Figure 11 is a perspective view, partly diagrammatic, of clutch actuating levers, and associated linkage mechanism, Figure 12 is an enlarged fragmentary detail view showing means for connecting a clutch setting sleeve to the frame of the machine, Figure 13 is a vertical section taken on line 13—13 of Figure 12, and, Figure 14 is a diagrammatic plan view of a log engaged by dogs carried by conveyor elements.

In the drawings, where for the purpose of illustration is shown a preferred embodiment of our invention, the numeral 20 designates a section of narrow gauge track arranged adjacent to the front longitudinal side 20' of a frame or bed 21, and extending past the bed in both directions. Carriages 22 and 23 are arranged upon the track 20, and are adapted to convey a long log L adjacent to the front side of the bed.

The bed 21 is horizontal, and suitably supported above the ground, so that its upper surface is substantially flush with the upper surfaces of carriages 22 and 23, Figure 3. At its front side 20' the bed 21 has mounted upon it a longitudinal chock 25, extending for the entire length of the bed and flush with the top surfaces of the carriages 22 and 23.

A suitable prime mover or motor 26 is arranged near one end of the bed 21, and near the transverse center of the same, and the drive shaft 26' of the motor extends longitudinally of the bed 21, as shown. Arranged substantially at the transverse center of the bed 21, and spaced above the bed is a longitudinally extending gang saw shaft 27. This shaft 27 is journaled in fixed bearings which are rigidly mounted upon transversely extending frame members or panels 21'', in turn rigidly mounted upon the bed 21. The shaft 27 extends for substantially the entire length of the bed 21, and one end of the shaft extends adjacent to the motor 26, Figure 1. At its end adjacent to the motor the shaft 27 is operatively connected through suitable gearing 28 with the drive shaft 26', as shown. Mounted upon the saw shaft 27 at spaced intervals, for rotation with such shaft, are three vertically disposed circular saws 30, 31 and 32. The center saw 31 is arranged substantially at the longitudinal center of bed 21, while the outer saws 30 and 32 are arranged substantially midway between the center saw 31 and the outer ends of the bed. We have shown three circular saws for the machine, but additional saws may be provided if desired. The circular saws 30, 31 and 32 are keyed to the shaft 27 for rotation therewith, and means are provided to permit the saws to shift slightly axially upon the shaft 27. The center saw 31 may shift axially in both directions upon the shaft 27. To permit this axial shifting, a sleeve 33 is rigidly mounted upon shaft 27, and held against axial and rotary motion with respect to the shaft. The sleeve 33 is provided with an elongated keyway 34 slidably receiving a key 35 connecting the hub 36 of saw 31 to the sleeve for rotation therewith. The saw 31 is bolted to an annular flange 37 of hub 36, Figure 10. The key 35 is rigidly secured to hub 36, but is slidable longitudinally in the keyway 34. The sleeve 33 has an annular flange 38 near one end, and a detachable annular ring or shoulder 39 is screw threaded upon its opposite end. Suitable compression springs 40 are mounted upon the sleeve, and arranged between the flange 38 and collar 39, and the ends of hub 36. These springs serve to maintain the saw 31 centered upon the sleeve, but permit some axial shifting of the saw. The outer saws 30 and 32 are shiftable in one direction only, away from the center saw 31. Figure 9 shows the construction whereby the outer saw 32 is shiftable axially upon the shaft 27. A sleeve 41 is rigidly secured to shaft 27 and provided with a longitudinal keyway 42. A hub 43 of saw 32 carries a key 44, rigidly secured to it, and slidable longitudinally in the keyway 42. The saw 32 is bolted to an annular flange 45 of the hub 43. The sleeve 41 has an annular flange or shoulder 46 at its inner end, and a detachable annular ring or shoulder 47 at its outer end which is screw threaded upon the sleeve. A compression spring 48 is mounted upon the sleeve 41 between the outer end of hub 43 and shoulder 47. This spring normally maintains the hub 43 in engagement with shoulder 46, but permits the saw 32 to be shifted axially outwardly. The opposite outer saw 30 is mounted upon shaft 27 in exactly the same manner as the saw 32, except that its sleeve 41, and associated elements, are arranged so that it may shift axially in the opposite direction upon the shaft.

Arranged rearwardly of saw shaft 27 and spaced above the same, and extending longitudinally of bed 21 for substantially the entire length of the bed, and journaled in fixed bearings which are rigidly mounted upon the transverse panels 21', is a horizontal conveyor chain shaft 49. One end of this shaft 49 extends adjacent to motor 26, as shown. Suitable gearing 51 operatively connects the shaft 49 with shaft 27. 51' designates a reversing speed reducer. Mounted upon conveyor chain shaft 49 at spaced intervals are four sets of conveyor chain clutches 52, Figures 1 and 5. The two inner sets of clutches 52 are arranged between the center saw 31 and outer saws 30 and 32, and the two outer sets 52 are disposed axially outwardly of saws 30 and 32. Each set of clutches 52, Figure 5, comprises a pair of opposed axially spaced clutch discs 53, including axially outwardly extending hubs 54, rigidly keyed to shaft 49 and held against turning and axial movement with respect to the shaft. The inner opposed faces of the clutch discs 53 carry friction linings 55 of asbestos or other suitable material. Arranged inwardly of the clutch discs 53 and slidably mounted on shaft 49 are sprocket wheels 56, including axially inwardly extending hubs 57, and outer flat clutch faces 58 to engage the friction linings 55. The sprocket wheels 56 are freely rotatable and axially shiftable upon shaft 49. Each clutch disc 53 carries an axial pin 59, rigidly secured in an opening formed in the disc, and extending inwardly from the disc. Each pin 59 projects through a circumferential slot 60, formed in the adjacent sprocket wheel 56. The inner end of each pin 59 is disposed inwardly of the associated sprocket wheel 56, and adjacent to hub 57. Connected to the inner end of each pin 59 is a strong retractile coil spring 61, the opposite end of which is attached to a pin or lug 62 secured to the inner face of the adjacent sprocket wheel 56. Each pin 59 is slidable in the associated slot 60. Disposed inwardly of hubs 57 and mounted upon the shaft 49 are axially shiftable sleeves 63 and 64, spaced apart slightly at their inner ends, as shown. The sleeve 63 is freely rotatable and axially shiftable upon the shaft 49, while sleeve 64 is axially shiftable only, and held against rotation with shaft 49. To hold the sleeve 64 against rotation, a crank or arm 65 is rigidly connected to sleeve 64, by welding or the like, and extends laterally rearwardly of the sleeve toward a rear upright frame member 66, mounted upon bed 21, Figures 12 and 13. The arm 65 has a rear transverse extension 67 provided with a longitudinal slot 68, receiving spacers or rollers 69, carried by studs 70, rigidly secured to frame member 66. The spacers or rollers 69 are slidable in slot 68, and permit the axial shifting of sleeve 64. At its inner end, sleeve 64 is provided with a pair of diametrically oppositely arranged notches, forming oppositely inclined cam faces 71, Figures 8. The adjacent rear end of sleeve 63 may be straight. Arranged between the inner ends of sleeves 63 and 64 and surrounding shaft 49 and slidable thereon, is the annular head 72 of a depending crank or lever 73. Head 72 is provided upon its side adjacent to sleeve 64 with diametrically oppositely arranged inclined teeth or cams 74 to engage the cam faces 71.

Each of the sets of clutches 52 is identical with the set shown and described in connection with Figure 5, and the crank 73 of each set 52 normally extends downwardly below shaft 49, Figures 3 and 5.

Arranged near the inner longitudinal edge of chock 25, and spaced beneath the same, and extending longitudinally of bed 21 for substantially its entire length, and journaled in fixed bearings secured to the bed, is a horizontal longitudinal lower shaft 75. This shaft 75 has rigidly mounted upon it sprocket wheels 76, which are lined with the corresponding sprocket wheels 56 on shaft 49. The sprocket wheels 76 are not shiftable axially upon the shaft 75. Conveyor chains 77 operatively connect companion sprocket wheels 56 and 76, as shown. These conveyor chains 77 extend transversely of bed 21 and are inclined upwardly toward the rear side 77' of the bed. The conveyor chains each carry a pair of log engaging dogs 78, securely mounted upon the outer sides of the chains and projecting laterally outwardly therefrom. The chains 77 pass close to the inner edge of chock 25, and longitudinally spaced notches 79 are provided in the chock to permit the passage of the dogs 78. The dogs 78 of each conveyor chain are spaced as far apart as possible upon the chain. Since four sets of clutches 52 and three circular saws are provided in this preferred embodiment of our invention, eight conveyor chains 77 are employed. The shafts 27, 49 and 75 lie substantially in an inclined plane parallel to the conveyor chains, Figure 3, and the shaft 27 is arranged between the upper and lower runs of chains 77. The diameters of saws 30, 31 and 32 are such that the saws project above the conveyor chains sufficiently to completely sever log L passing through the saws. We provide means to actuate the sets of clutches 52. Such means comprises a pair of levers 80 extending transversely of the machine and arranged substantially midway between the center saw 31 and the outer saws, Figure 1. Each lever 80 comprises a straight elongated portion 81, normally arranged in an inclined position, parallel to the upper runs of chains 77; and the straight portions 81 are arranged so that they extend across substantially the full diameters of the saws. At their forward ends the straight lever portions 81 carry upwardly curved ends 82 for engagement by the log L. At their upper ends, and beginning near the shaft 49, the portions 81 curve upwardly and rearwardly, forming upstanding curved loops 83, the rear lower ends of which are pivotally connected, as at 83′, to brackets 84 rigidly mounted upon an upright frame member 85 secured to the bed 21. The upper discharge ends of conveyor chains 77 are arranged beneath the loops 83. The levers 80 further include depending straight extensions 86, disposed rearwardly of frame member 85, as shown. At their lower ends, extensions 86 are pivotally connected at 87 to substantially horizontal longitudinally shiftable links 88, extending forwardly of extensions 86, as shown. The forward ends of links 88 are disposed beneath shaft 49 and pivotally connected at 89 to the lower ends of the depending cranks 73 of the two inner sets of clutches 52. The levers 80 are adapted to swing vertically to set and release the clutches, and when they are so swung links 88 move substantially horizontally, but are swung through a small vertical angle, Figure 4. At intermediate points on the links 88, and rearwardly of cranks 77, the links are pivotally connected with the upper ends of cranks 91, provided near their upper ends with slots 92 to permit links 88 to move slightly vertically. At their lower ends cranks 91 are rigidly secured to the inner ends of horizontal rock shafts 93 which extend longitudinally of bed 21, and parallel to shaft 49. The rock shafts 93 are journaled in fixed bearings 94, rigidly secured to the upstanding frame member 66. At their outer ends, the rock shafts 93 have rigidly secured to them upstanding cranks or levers 96, parallel to cranks 91 and extending upwardly for the same distances as cranks 91. At their top ends, cranks 96 are pivotally connected to short horizontal links 97, extending rearwardly to the two outer cranks 73. At their forward ends, links 97 are pivotally connected at 98 to the lower ends of the two outer cranks 73, Figure 11.

Adjacent to the discharge ends of conveyor chains 77 and extending longitudinally of the bed 21 for substantially its entire length is a horizontal longitudinal trough 99. This trough 99 receives the cut log sections as they are discharged from the upper ends of the conveyor chains. The trough 99 is supported by the upstanding frame members 66 and 85. Arranged in the bottom of trough 99 is an endless conveyor chain 100, provided with spaced transverse lugs or plates 101, rigidly secured thereto, and adapted to engage the cut log sections and move them longitudinally in the trough. The conveyor chain 100 engages sprocket wheels 102 and 103 near the ends of the bed 21, and mounted upon shafts 104 and 105, arranged beneath the trough and transversely of the same, and journaled in fixed bearings. At its end near shaft 105 trough 99 has a longitudinal upwardly inclined trough extension 106, extending outwardly beyond the end of the bed 21. An inclined endless conveyor chain 107 is disposed in the bottom of trough extension 106, and provided with spaced transverse lugs 108 to engage the cut log sections. Conveyor chain 107 engages sprocket wheels 109 and 110, mounted upon shafts 111 and 112, as shown. The inner end of conveyor chain 107 is arranged close to the adjacent end of chain 100, so as to provide a substantially continuous conveyor for the cut log sections. The shafts 111 and 112 are arranged transversely of the trough extension 106 and are journaled in fixed bearings. A separate motor 113, Figure 2, is mounted upon bed 21 near its end adjacent to trough section 106, and the armature shaft of this motor carries a pulley 114, operatively connected with a belt 115, in turn operatively connected with a pulley 116 mounted upon shaft 111. A belt 117 operatively connects pulley 116 with a pulley 118 mounted upon the shaft 105. It is thus seen that the motor 113 will drive the conveyor chains 100 and 106 in the same direction simultaneously.

Arranged near the end of bed 21, remote from motor 26, is a pivoted cut-off saw 119, comprising a vertically swingable arm 120, pivotally connected to the outer end of saw shaft 27. The arm 120 extends forwardly and rearwardly of shaft 27, and is provided at its rear end with a counterweight 122. At its forward end generally above the track 20, arm 120 carries a vertically disposed circular saw 123 mounted upon a short horizontal shaft 124, journaled in fixed bearings upon the arm 120. Shaft 124 carries a pulley 125 operatively engaged by a belt 126, extending rearwardly and operatively engaging the pulley mounted upon the end of shaft 27. The cut-off saw 123 is thus driven through the belt 126 by the shaft 27. At its forward end and forwardly of saw 123 the arm 120 carries a handle 127, to be grasped for swinging the cut-off saw downwardly. The arrangement is such that the counterweight 122 normally maintains the arm 120 in the inclined position shown in Figures 3 and 4.

The operation of the machine is as follows:

A log L to be cut into sections for making pulpwood or the like is placed upon the carriages 22 and 23 and moved along track 20 adjacent to the front side of bed 21. The log should be approximately 21 feet long, and the cut-off saw 119 is used to cut the log to this proper initial length. The log L thus cut is rolled into the chock 25, and into contact with the lower ends of the moving conveyor chains 77. As can be clearly seen in Figure 14, the log L, representing a typically crooked log, may be offset laterally as much as nine inches. This dimension is approximately the maximum extent of crookedness to be anticipated in a 21 foot log of the type handled by the machine. With the log shaped generally as in Figure 14, the sets of clutches 52 function to permit the necessary lost motion for the individual conveyor chains 77, so that one dog 78 of each chain will contact the log L before the log starts to move upwardly with the chains 77. In this way, no one or two chains 77 have to do all of the work, and the load of the log is distributed equally among all eight of the chains. The motor 26 through the gearing 28 and 51' drives shafts 27 and 49 continuously. The reversing speed reducer 51 causes the conveyor chain shaft 49 to rotate oppositely to the direction of rotation of shaft 27, and at a greatly reduced speed. This is necessary, since the saws 30, 31 and 32 must revolve at a high speed, while the conveyor chains 77 move relatively slowly. As viewed in Fig. 3, shaft 49 rotates counterclockwise, driving the conveyor chains 77 upwardly, while shaft 27 rotates clockwise. When the first dog 78 contacts log L near the left hand end of the same, Figure 14, that dog will stop due to the lost motion of chain 77 carrying it, and the dog will dwell long enough for the remaining dogs 78 carried by the other conveyor chains 77 to move into engagement with the offset portion d of the log. As the first dog 78 contacts the log, a load will of course be placed upon the chain 77 carrying that dog, the particular chain being driven by shaft 49, and through one clutch disc 53 and sprocket wheel 56 of a single set of clutches 52. At the instant the first dog 78 engages the log L, the clutch actuating levers 80 are in their lowered positions, Figure 3, and cranks 73 are vertical. The clutch discs 53 are all separated from the faces 58 of sprocket wheels 56. The driving of all of the chains 77, at this time, is done entirely through springs 61. When the first dog 78 engages the log, the spring 61 connected with the sprocket wheel 56 of the chain carrying the particular dog 78 will stretch and permit the sprocket wheel 56 to stop or dwell, while the clutch disc 53 continues to turn with shaft 49, and the pin 59 moves clockwise in the circumferential slot 60 of the sprocket wheel, Figure 6. The slot 60 is of sufficient length to permit approximately nine inches lost motion which may be necessary for the dog 78 first engaging the log. This same lost motion can occur at any of the conveyor chains 77 independently, and the necessary amount of lost motion in the individual chains 77 takes place until a dog 78 of each chain engages the log L. Of course, if the log L were perfectly straight, all of the dogs 78 would engage the log simultaneously and the log would at once start to move upwardly with the chains 77. In any case, when all of the dogs 78 have engaged the log, the same will travel upwardly with the conveyor chains. At this time the springs 61 are still doing the driving and together absorbing the load. The springs 61 are of course relatively heavy springs.

As the upward movement of the log L continues, the log will engage under the upturned ends 82 and swing levers 80 upwardly toward their positions in Figure 4. By the time the log advances into saws 30, 31 and 32, the levers 80 have swung upwardly sufficiently to set all of the clutches. When this occurs the driving of the conveyor chains 77 is done through the clutches rather than through the springs 61, and the drive is therefore positive, so that the log may be pushed past the saws and severed. When the clutches are set for driving the log through the saws, there is no tendency for the conveyor chains to slip and for any lost motion to occur in them. When the levers 80 are swung upward by the log, the depending extensions 86 swing counterclockwise, Figure 4, and the links 88 shift to the right. The cranks 73 of the two inner sets of clutches 52 simultaneously swing counterclockwise, Figure 4. The cranks 91 are simultaneously swung clockwise, turning rock shafts 93 clockwise, Figure 4, and in turn swinging the end cranks 96 in the same direction as the cranks 91, and swinging the outer cranks 73 in the same direction as the inner cranks 73. All of the cranks 73 are thus swung in unison when the levers 80 move upwardly, and all of the clutches are set simultaneously. When each crank 73 swings counterclockwise, Figure 4, the teeth or cams 74 of head 72 force the adjacent sleeve 64 to the right, Figure 5, and move the sprocket wheel 56 to the right and into engagement with the adjacent clutch disc 53. The sleeve 64 is of course secured against rotation. Simultaneously, due to the opposing reaction of sleeve 64 to its axial movement, the sleeve will tend to cause crank 73 to shift to the left, Figure 5, and sleeve 63 will be shifted to the left, causing the left hand sprocket wheel 56 to engage the left hand clutch disc 53. There is sufficient play in the lever 73 to permit it to cause this spreading action of sleeves 63 and 64. This same action occurs simultaneously at each of the sets of clutches 52.

When the log passes completely through saws 30, 31 and 32, and beyond its position shown in Figure 4, the levers 80 are lowered into their normal positions and the clutches are released, whereupon the springs 61 again become the driving members. The log L has now been cut into log sections which are discharged at the top ends of the conveyor chain 77, and into the trough 99 upon the conveyor chain 100, where they are engaged by the lugs 101 and moved to the right, Figure 2. The log sections pass onto the inclined conveyor chain 107, and are finally discharged into a truck, or the like, at the outer end of conveyor chain 107.

If there is any tendency for the cut log sections to become cocked or turned between the rapidly rotating saws 30, 31 and 32, the springs 40 and 48 and associated elements permit the saws to shift axially to allow the necessary clearance. Damage to the saws is thus avoided.

It is to be understood that the form of our invention herewith shown and described is to be taken as a preferred example of the same, and that various changes in the shape, size and arrangement of parts may be resorted to, without departing from the spirit of the invention or the scope of the subjoined claims.

Having thus described our invention, we claim:

1. In a gang saw machine for cutting logs into sections, a support, a saw shaft mounted upon the support, spaced saws mounted upon the saw shaft, means to drive the saw shaft, endless conveyors to advance the log into engagement with the saws, a conveyor drive shaft, a rotary element engaging each endless conveyor and slidably mounted upon the conveyor drive shaft, a disc mounted upon the conveyor drive shaft to positively rotate therewith and held against longitudinal movement with relation to the conveyor drive shaft, a pin carried by the disc, a spring secured to the pin and connected with the rotary element, a device to move the rotary element axially of the conveyor drive shaft into engagement with the disc to be positively driven by the disc, and means to operate the device including an element arranged in the path of travel of the log to be shifted thereby.

2. In a gang saw machine for cutting logs into sections, a support, a saw shaft mounted upon the support, spaced saws mounted upon the saw shaft to be driven thereby, means to drive the saw shaft, endless conveyors to advance the log into engagement with the saws, a conveyor drive shaft, a rotary element engaging each endless conveyor and slidably mounted upon the conveyor drive shaft and having a circumferentially extending slot, a disc fixedly mounted upon the conveyor drive shaft and having a clutch face for engagement with the adjacent face of the rotary element, a pin secured to the disc and extending through the slot, a retractile coil spring secured to the pin and connected with the rotary element, a sleeve slidable upon the conveyor drive shaft to move the rotary element axially of such drive shaft, and means to effect a longitudinal movement of the sleeve including an element arranged in the path of travel of the log to be shifted thereby.

3. In a gang saw machine for cutting logs into sections, a support, a saw shaft mounted upon the support, spaced saws mounted upon the saw shaft, means to drive the saw shaft, endless conveyors to advance the log into engagement with the saws, a conveyor drive shaft, a pair of rotary elements engaging the endless conveyors and slidably mounted upon the conveyor drive shaft, discs fixedly mounted upon the conveyor drive shaft for frictional engagement with the rotary elements, yieldable means connecting each disc with its adjacent rotary element, sleeves slidable upon the conveyor drive shaft and engaging the rotary elements in the pair to shift them axially toward the discs, a pivoted cam device to move the sleeves axially, and a lever pivotally mounted upon the support and connected with the pivoted cam device and having one end thereof arranged in the path of travel of the log.

4. In a gang saw machine for cutting logs into sections, a support, a saw shaft mounted upon the support, spaced saws mounted upon the saw shaft for rotation therewith, means to drive the saw shaft, endless conveyors to advance the log into engagement with the saws, a conveyor drive shaft, a rotary element engaging each endless conveyor and slidably mounted upon the conveyor drive shaft and having a circumferentially extending slot, a disc fixedly mounted upon the conveyor drive shaft and having a clutch face engageable with the rotary element, a pin secured to the disc and extending through the slot, a retractible coil spring secured to the pin and connected with the rotary element, a sleeve slidable upon the conveyor drive shaft to shift the rotary element along such drive shaft into clutching engagement with said disc, a pivoted cam device to move the sleeve longitudinally of the conveyor drive shaft upon turning movement of said cam device, and a lever pivotally mounted upon the support and connected with the pivoted cam device to turn said cam device upon swinging of said lever, said lever having a part thereof arranged in the path of travel of the log to cause said lever to swing.

5. In a gang saw machine for cutting logs into sections, a support, a rotary saw shaft mounted upon the support, spaced saws mounted upon the saw shaft for rotation therewith, means to drive the saw shaft, endless conveyors to advance the log into engagement with the saws, a rotary conveyor drive shaft, a rotary element engaging each endless conveyor and slidably mounted upon the conveyor drive shaft, a clutch element fixedly mounted upon the conveyor drive shaft and engageable with the rotary element when the rotary element is shifted longitudinally of the conveyor drive shaft in one direction, resilient means connecting the rotary element and clutch element for effecting a yielding driving connection between the same, a sleeve slidably mounted upon the conveyor drive shaft for engagement with the rotary element to shift it toward the fixed clutch element, a pivoted cam device engaging the sleeve to shift it longitudinally of the conveyor drive shaft upon turning of said cam device, and a lever pivotally mounted upon the support and connected with the pivoted cam device to turn said device upon swinging of said lever, said lever having a part arranged in the path of travel of the log for engagement with the log while the log is being advanced toward the saws to cause said lever to swing.

6. In a gang saw machine for cutting logs into sections, a support, a rotary saw shaft mounted upon the support, spaced saws mounted upon the saw shaft for rotation therewith, means to drive the saw shaft, endless conveyors to advance the log into engagement with the saws, a rotary conveyor drive shaft, a rotary element engaging each conveyor and slidably connected with the conveyor drive shaft, a clutch element fixedly secured to the conveyor drive shaft for rotation therewith and engageable with the rotary element when such element is shifted longitudinally of the conveyor drive shaft in one direction, a spring connecting each rotary element and clutch element for effecting a yielding driving connection between the conveyor drive shaft and rotary elements, cam means acting upon the rotary elements for shifting them toward the clutch elements for clutching engagement, and a pivoted lever connected with the cam means to produce such shifting when the free end of the lever is raised, such free end arranged in the path of travel of the log and projecting above the endless conveyors so that said free end of the lever is elevated by engagement with the log.

7. In a gang saw machine for cutting logs into sections, a support, a rotary saw shaft mounted upon the support, spaced saws mounted upon the saw shaft for rotation therewith, means to drive the saw shaft, endless conveyors to advance the log into engagement with the saws, a rotary conveyor drive shaft, a rotary element engaging each conveyor and slidably connected with the conveyor drive shaft, a clutch element fixedly secured to the conveyor drive shaft for rotation therewith and engageable with the rotary element when such element is shifted longitudinally of the conveyor drive shaft in one direction, a spring connecting each rotary element and clutch element for effecting a yielding driving connection between the conveyor drive shaft and rotary elements, a sleeve slidably mounted upon the conveyor drive shaft for engagement with the rotary element to shift such element toward the clutch element, a pivoted cam device engaging the sleeve to shift it longitudinally of the conveyor drive shaft, and a pivoted lever connected with the pivoted cam device and having a part projecting above the endless conveyors and in the path of travel of the log so that the log will elevate the lever and turn the pivoted cam device as the endless conveyors advance the log toward the saws.

ERNEST C. AVINGER.
THEODORE T. MURPHY.

(References on following page)

REFERENCES CITED

The following references are of record in the file of this patent:

UNITED STATES PATENTS

| Number | Name | Date |
|---|---|---|
| 399,900 | Hoyt | Mar. 19, 1889 |
| 832,273 | Perron | Oct. 2, 1906 |
| 970,915 | Gebott | Sept. 20, 1910 |
| 1,062,175 | Marten et al. | May 20, 1913 |
| 1,217,502 | Reynolds | Feb. 27, 1917 |
| 1,339,051 | Barrett | May 4, 1920 |
| 1,454,992 | Willette | May 15, 1923 |
| 1,629,977 | Snyder | May 24, 1927 |
| 2,332,654 | Mead et al. | Oct. 26, 1943 |
| 2,496,613 | Woodward | Feb. 7, 1950 |

FOREIGN PATENTS

| Number | Country | Date |
|---|---|---|
| 354,228 | France | July 21, 1905 |
| 704,089 | Germany | Mar. 22, 1941 |